(12) United States Patent
Endou et al.

(10) Patent No.: US 8,567,865 B2
(45) Date of Patent: Oct. 29, 2013

(54) CONNECTING APPARATUSES

(75) Inventors: Takayuki Endou, Toyota (JP); Hideki Uramichi, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 434 days.

(21) Appl. No.: 12/599,827

(22) PCT Filed: Mar. 24, 2008

(86) PCT No.: PCT/JP2008/055410
§ 371 (c)(1),
(2), (4) Date: Nov. 12, 2009

(87) PCT Pub. No.: WO2008/146523
PCT Pub. Date: Dec. 4, 2008

(65) Prior Publication Data
US 2010/0269615 A1 Oct. 28, 2010

(30) Foreign Application Priority Data
Jun. 1, 2007 (JP) ................................. 2007-146868

(51) Int. Cl.
*B60N 2/235* (2006.01)
(52) U.S. Cl.
USPC .................................. 297/367 L; 297/367 P
(58) Field of Classification Search
USPC ................. 297/367 R, 367 P, 367 L
See application file for complete search history.

(56) References Cited

U.S. PATENT DOCUMENTS

| | | | | |
|---|---|---|---|---|
| 4,770,464 A * | 9/1988 | Pipon et al. | ............... | 297/367 R |
| 4,789,205 A * | 12/1988 | Pipon et al. | ............... | 297/367 R |
| 6,325,458 B1 * | 12/2001 | Rohee et al. | ............... | 297/367 R |
| 6,328,383 B2 * | 12/2001 | Rohee et al. | ............... | 297/367 R |
| 6,796,612 B2 * | 9/2004 | Shephard | ................... | 297/367 R |
| 6,843,533 B1 * | 1/2005 | Miyata et al. | ............. | 297/367 R |
| 7,100,987 B2 * | 9/2006 | Volker et al. | .............. | 297/367 R |

(Continued)

FOREIGN PATENT DOCUMENTS

| | | |
|---|---|---|
| JP | 2001-25415 | 1/2001 |
| JP | 2004-187867 | 7/2004 |

(Continued)

OTHER PUBLICATIONS

English language Abstract of JP 2005-230300, Sep. 2, 2005.

(Continued)

*Primary Examiner* — David E Allred
(74) *Attorney, Agent, or Firm* — Greenblum & Bernstein, P.L.C.

(57) ABSTRACT

A connecting apparatus of the present invention includes an inner teeth member with inner teeth, a guide member with a rotation support portion rotatably supporting an outer peripheral surface of the inner teeth member, a first and second teeth member movably mounted on the guide member, and a switching member capable of switching a lock state and an unlock state by moving the first and second outer teeth members. Further the connecting apparatus includes a backlash preventing mechanism capable of preventing a backlash of the inner teeth member with respect to the guide member by the switching member pushing the inner teeth member (6) to the rotation support portion of the guide member. Space is formed between outer teeth of the second outer teeth member and the inner teeth of the inner teeth member. The space permits them to mesh with each other, and forms clearance between them in a radial direction.

2 Claims, 6 Drawing Sheets

(56) References Cited

U.S. PATENT DOCUMENTS

| | | |
|---|---|---|
| 7,744,157 B2 * | 6/2010 | Ishihara et al. ............ 297/367 P |
| 2001/0001220 A1 * | 5/2001 | Rohee et al. ................ 297/367 |
| 2003/0178879 A1 * | 9/2003 | Uramichi ..................... 297/367 |
| 2004/0113475 A1 | 6/2004 | Uramichi et al. |
| 2005/0052063 A1 * | 3/2005 | Volker et al. ................ 297/369 |
| 2005/0264076 A1 * | 12/2005 | Uramichi et al. ............. 297/367 |
| 2006/0022503 A1 * | 2/2006 | Reubeuze et al. ........ 297/378.12 |
| 2006/0043778 A1 * | 3/2006 | Volker et al. .............. 297/361.1 |
| 2007/0057558 A1 | 3/2007 | Kojima |
| 2009/0250989 A1 | 10/2009 | Endo et al. |
| 2009/0250990 A1 | 10/2009 | Endo et al. |
| 2012/0126603 A1 * | 5/2012 | Peters ....................... 297/367 P |
| 2012/0169104 A1 * | 7/2012 | Stilleke et al. ................ 297/362 |
| 2012/0217782 A1 * | 8/2012 | Yamada et al. ........... 297/367 R |

FOREIGN PATENT DOCUMENTS

| | | |
|---|---|---|
| JP | 2005-230300 | 9/2005 |
| JP | 2007-75424 | 3/2007 |
| WO | 2004/012560 | 2/2004 |

OTHER PUBLICATIONS

English language Abstract of JP 2007-75424, Mar. 29, 2007.
English language Abstract of JP 2001-25415, Jan. 30, 2001.
English language Abstract of JP 2004-187867, Jul. 8, 2004.

* cited by examiner

CONNECTING APPARATUSES

TECHNICAL FIELD

The present invention relates to a connecting apparatus used for a reclining apparatus of a vehicle seat, etc. Specifically, the present invention relates to a connecting apparatus with a preventing backlash mechanism.

BACKGROUND ART

Conventionally, a connecting apparatus used for a reclining apparatus of a vehicle seat or the like is known. (Refer to FIG. 5 in Japanese Laid-Open Patent Publication No. 2004-187867.) As shown in FIG. 6, a conventional connecting apparatus includes inner teeth member 36 attached one of a seat cushion and a seat back, and a guide member 32 attached the other one of the seat cushion and the seat back to rotatably support the inner teeth member 36. On the guide member 32, outer teeth members 34 and 35 meshing with inner teeth of the inner teeth member 36, and switching member 33 are provided. The switching member 33 may switch a lock state in which the outer teeth members 34 and 35 mesh with the inner teeth member 36 by moving the outer teeth members 34 and 35 in a radial direction, and an unlock state in which the outer teeth members 34 and 35 do not mesh with the inner teeth member 36.

Therefore, in the lock state the switching member, the outer teeth members 34 and 35 and the inner teeth member 36 are integrated. Thus their rotation are restricted by guide portions 32e and 32f of the guide member 32 for guiding the outer teeth members 34 and 35. However, between the guide portions 32e and 32f and the outer teeth members 34 and 35, clearances L are formed for the guide member 32 to slidably support the outer teeth members 34 and 35. Thus, the clearances L cause a backlash, and large backlash is caused at tip end of the seat back.

Thus, a method for restricting the backlash by reducing the clearances described above may be supposed. However, the reducing the clearances causes problems such that a manufacturing of the apparatus is difficult and a production cost is high, etc. Thus, there is a need in the art for a connecting apparatus capable of securely restricting the backlash without reducing the clearances.

SUMMARY

The present invention includes a backlash preventing mechanism capable of preventing a backlash of an inner teeth member with respect to a guide member by a switching member pushing the inner teeth member to the rotation support portion of the guide member through a first outer teeth member in a lock state. In the lock state, the space is formed between outer teeth of a second outer teeth member and inner teeth of the inner teeth member, the space permits the outer teeth and the inner teeth to mesh them each other and forms clearance between them in a radial direction.

Therefore, the inner teeth member is pushed to the guide member via the first outer teeth member in the lock state. Thus, the backlash of the inner teeth member with respect to the guide member is prevented. On the other hand, the space is formed between the second outer teeth member and the inner teeth member, and the clearance is formed between them in the radial direction. Thus, the inner teeth member is securely pushed to the guide member because the second outer teeth member does not interrupt the inner teeth member. In addition, the second outer teeth member restricts a relative rotation of the inner teeth member because the second outer teeth member meshes with the inner teeth member in the lock state.

Further, the rotation support portion of the guide member of the invention may be provided with a concave portion on an inner peripheral portion thereof where the inner teeth member is pushed in the lock state. The inner teeth member may be pushed on two corners of the concave portion. As the configuration, the inner teeth member is securely supported by the two points of the guide member in the lock state. As a result, the backlash of the inner teeth member may be securely prevented.

Further, the backlash preventing mechanism may include a protruding portion protruding from one of a support surface of the guide member and the switching member to the other. The protruding portion may be provided with an inclined surface capable of gradually displacing the switching member to the first outer teeth member with respect to the guide member in the radial direction when the switching member moves from an unlock state to the lock state. As the configuration, the switching member gradually moves to the first outer teeth member. Thereby, the first outer teeth member may securely push the inner teeth member to the guide member regardless of a variety size thereof due to design errors.

BEST MODE FOR CARRYING OUT THE INVENTION

First Embodiment

Figure 3:
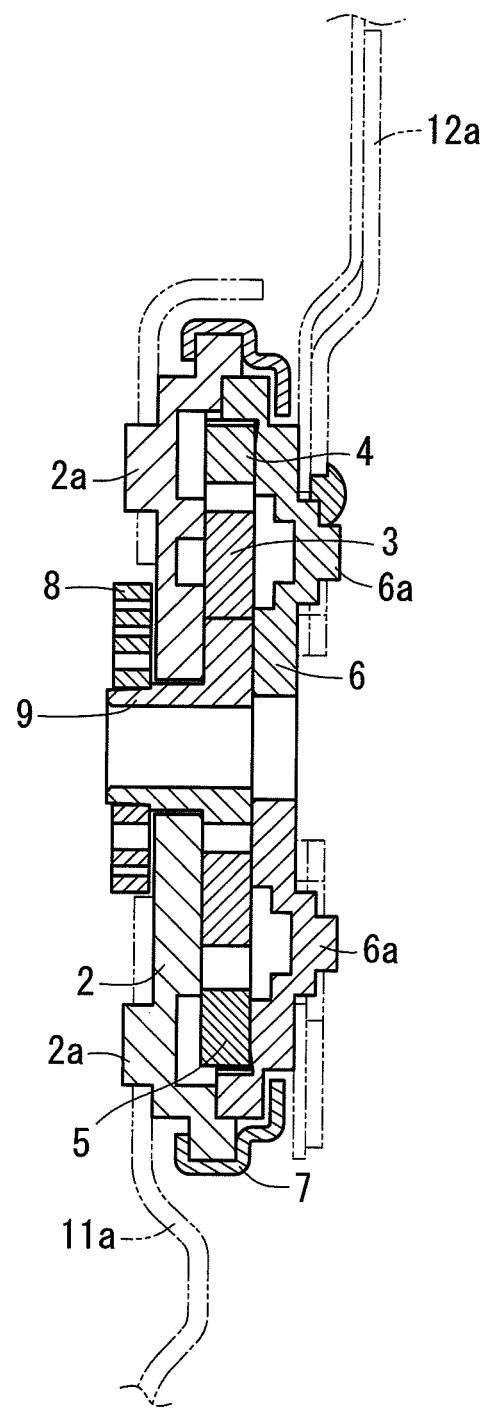
FIG. 3 is a cross-sectional view taken along line in FIG. 2.
Figure 4:
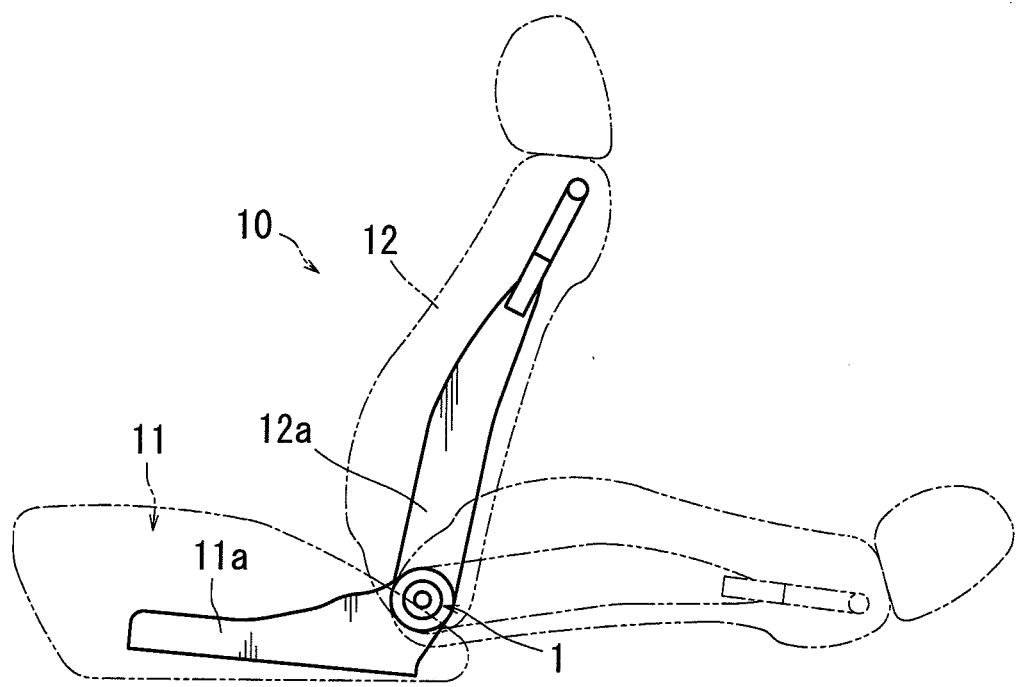
FIG. 4 is a side view of a vehicle seat.

A first embodiment will be explained in accordance with FIGS. 1 to 4. As shown in FIG. 4, a connecting apparatus 1 is used for a reclining apparatus of a vehicle seat 10, and is disposed between a seat cushion 11 and a seat back 12 of the vehicle seat 10. The connecting apparatus 1 rotatably and concentrically connects a frame 11a of the seat cushion 11 and a frame 12a of the seat back 12. The connecting apparatus 1 switches between an unlock state in which the seat back 12 is capable of rotating with respect to the seat cushion 11 and a lock state in which the seat back 12 is not capable of rotating with respect to the seat cushion 11.

Figure 1:
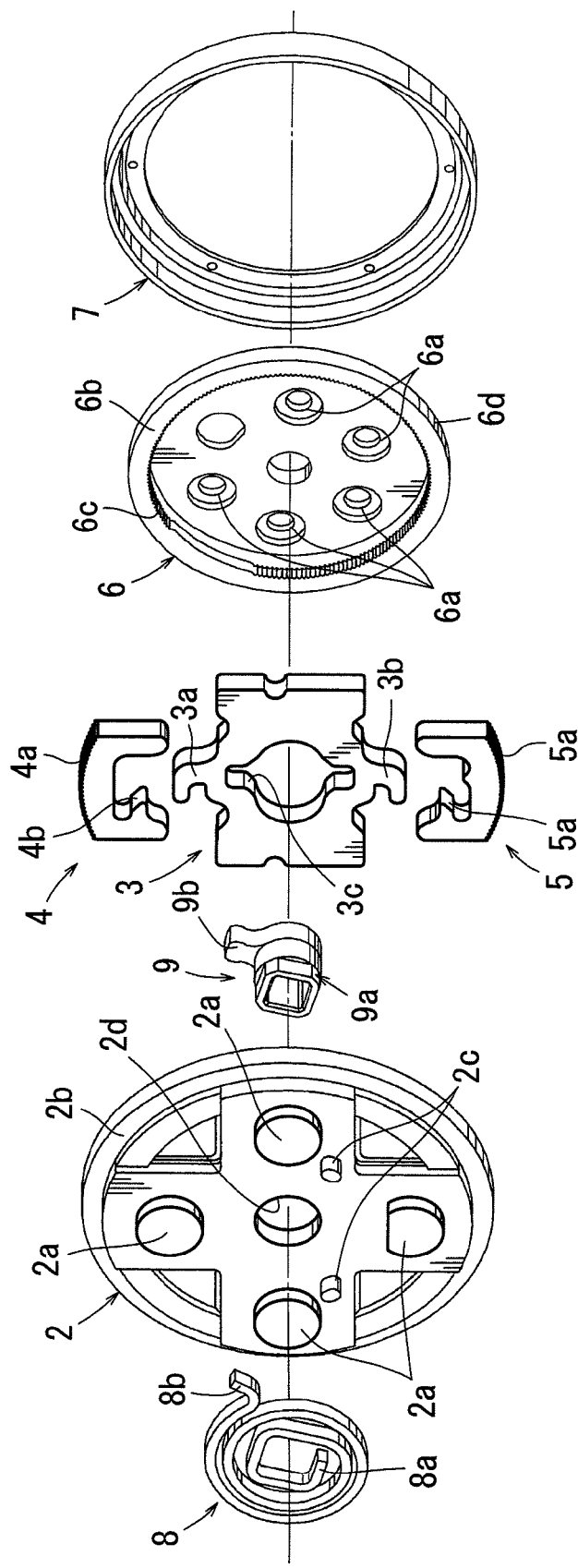
FIG. 1 is an exploded perspective view of a connecting apparatus.

As shown in FIG. 1, the connecting apparatus 1 includes a guide member 2 and an inner teeth member (ratchet) 6 rotatably mounted on the guide member 2. A switching member (slide cam) 3 and plural outer teeth members (slide pawls) 4 and 5 are movably mounted on the guide member 2.

As shown in FIG. 1, the guide member 2 has a disk shape and includes plural convex portions 2a on an outer side surface. The convex portions 2a are attached to the frame 11a of the seat cushion 11 or the frame 12a of the seat back 12 shown in FIGS. 3 and 4. As shown in FIG. 1, a hole 2d through which an operating member 9 is rotatably inserted is formed at an axis center of the guide member 2. The operating member 9 has an engaging portion 9a at one end. A center portion 8a of a coil spring 8 is engaged at the engaging portion 9a. An end portion 8b of the coil spring 8 is hooked to one of hooked portions 2c formed on the outer side surface of the guide member 2.

Figure 2:
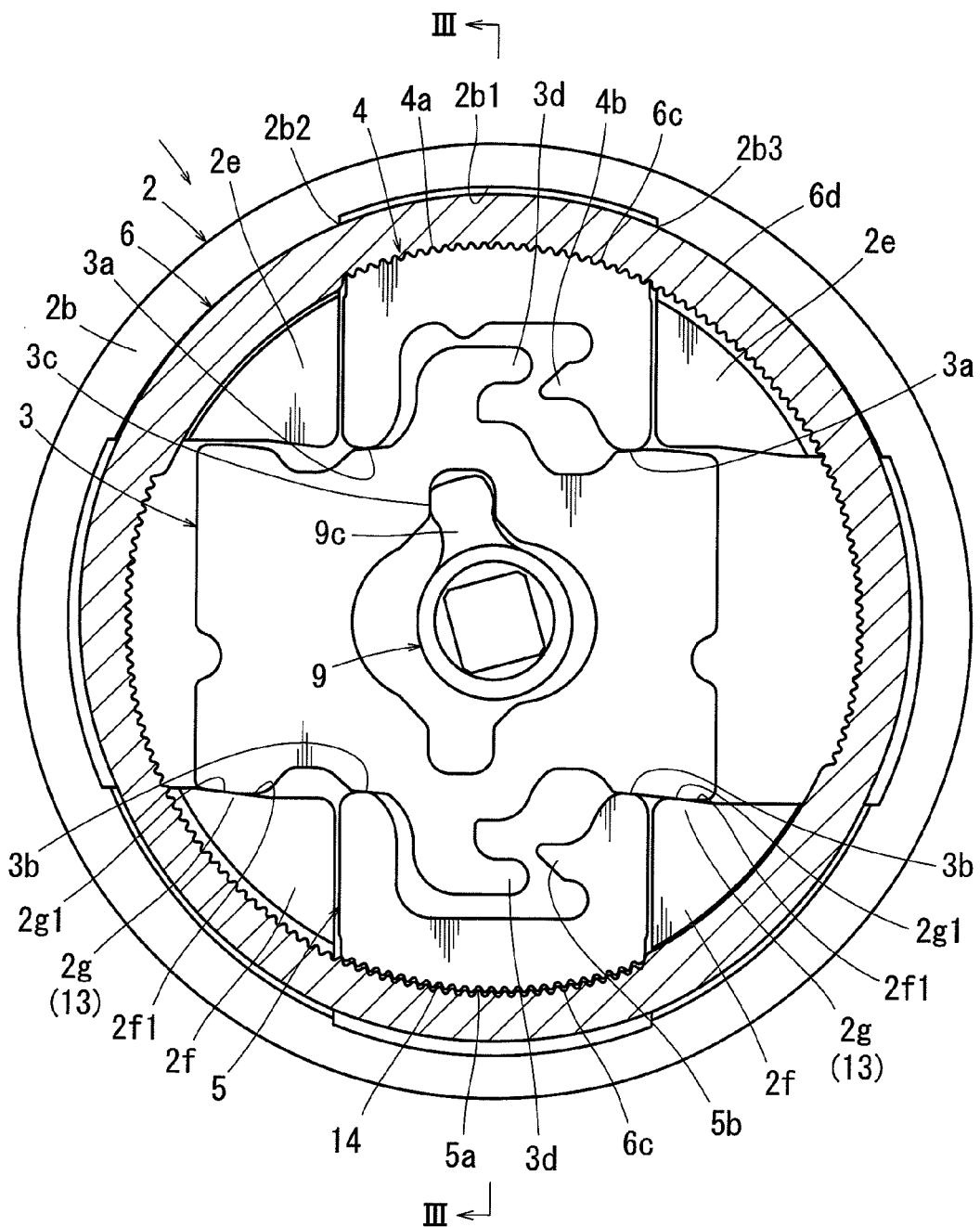
FIG. 2 is a front sectional view of the connecting apparatus in a lock state.

As shown in FIG. 2, a rotation support portion 2b and guide portions 2e and 2f are formed at an inner side surface of the guide member 2. The rotation support 2b are provided along an outer peripheral end of the guide member 2, and stands. The inner teeth member 6 is rotatably set at an inner peripheral side of the rotation support member 2b. An outer peripheral surface 6d of the inner teeth member 6 is slidably guided and supported by the rotation support portion 2b. The guide portions 2e and 2f are positioned at inner peripheral side position relative to the rotation support member 2b, and stand. The guide portions 2e and 2f form a crossed aisle between them.

As shown in FIG. 2, the first outer teeth member 4 is set movably in a radial direction between a pair of the guide portions 2e. The second outer teeth member 5 is set movably in the radial direction between a pair of the guide portions 2f. The guide portions 2f are located at the opposite side in the radial direction with respect to the side at which the guide portions 2e are located. The switching member 3 is movably set between the guide portions 2e and 2f. The switching member 3 is able to move in a perpendicular direction to the movement direction of the outer teeth members 4 and 5. Therefore, the outer teeth members 4 and 5 and the switching member 3 are guided and supported by the guide portions 2e and 2f.

As shown in FIG. 2, the switching member 3 includes pushing portions 3a and 3b for pushing the outer teeth members 4 and 5 in the outer radial directions, and claws 3d for pulling back the outer teeth members 4 and 5 in the inner radial directions. The operating member 9 is inserted through a center of the switching member 3. The operating member 9 is operated by an operating lever not shown, and includes an arm 9c fitted in a fitting portion 3c of the switching member 3.

The operating member 9 is biased by a bias force of the coil spring 8 shown in FIG. 1, and pushes the switching member 3 to a lock position as shown in FIG. 2 (in a left direction). The switching member 3 pushes the outer teeth members 4 and 5 locating at the lock positions in the outer radial directions. Thus, the outer teeth members 4 and 5 mesh with the inner teeth member 6, and the connecting apparatus 1 is made in the lock state. The operating member 9 pushes the switching member 3 in an unlock direction that is right direction of FIG. 2, when the operating member 3 is rotated by the operating lever. The switching member 3 pulls back the outer teeth members 4 and 5 in the inner radial directions by claws 3d. Thereby, the outer teeth members 4 and 5 are released from meshing with the inner teeth member 6, thus the connecting apparatus 1 is made in the unlock state.

As shown in FIG. 2, outer teeth members 4 and 5 have outer teeth 4a and 5a and hook portions 4b or 5b. The outer teeth 4a and 5a are provided on outer radial surfaces of the outer teeth members 4 and 5, and mesh with the inner teeth 6c of the inner teeth member 6 in the lock state. The hook portions 4b and 5b are provided at inner radial portions of the outer teeth members 4 and 5, and are pushed in the radial inner directions by the claws 3d of the switching member 3 in the unlock state.

As shown in FIG. 1, the inner teeth member 6 has a disk shape and includes a ring-shape rib 6b at an outer peripheral edge. As shown in FIG. 2, the rib 6b is rotatably set at an inner peripheral side of the rotation support portion 2b of the guide member 2. The inner teeth 6c is provided at an inner peripheral surface of the rib 6b. As shown in FIG. 1, a plurality of convex portions 6a are formed on an outer side surface of the inner teeth member 6. As shown in FIGS. 3 and 4, the convex portions 6a are attached to one of members of seat cushion 11 and seat back 12, the other one to which the guide member 2 is attached.

As shown in FIG. 1, a mounting member 7 has a circular ring shape. An outer peripheral portion of the mounting member 7 is calked to the outer peripheral portion of the guide member 2 in a state wherein the inner teeth member 6 is set between the mounting member 7 and the guide member 2. Thereby, the inner teeth member 6 is rotatably mounted at the guide member 2 and is prevented from detaching from the guide member 2.

As shown in FIG. 2, the guide portions 2f of the guide member 2 are provided with support surfaces 2f1. The support surfaces 2f1 support the switching member 3 to stop the first outer teeth member 4 from moving apart from the inner teeth member 6 in the lock state.

As shown in FIG. 2, the backlash prevent mechanism 13 is formed between the switching member 3 and the guide member 2f. The backlash preventing mechanism 13 includes protruding portions 2g protruding from each supporting surface 2f1 of the guide portion 2f to the switching member 3. The protruding portions 2g include inclined surfaces to gradually move the switching member 3 to the first outer teeth member 4 by moving the switching member 3 from the unlock state (at left side position of FIG. 2) to the lock state (at right side position of FIG. 2).

Thereby, the switching member 3 moves not only in a left direction but also in an upper direction, when the switching member 3 moves from the unlock state to the lock state. Thus, the switching member 3 moves to the first outer teeth member 4 and pushes the first outer teeth member 4 to the inner teeth member 6. Moreover, the switching member 3 pushes the inner teeth member 6 to the rotation support member 2b of the guide member 2 via the first outer teeth member 4.

As shown in FIG. 2, an inner peripheral surface of the rotation support portion 2b to which the inner teeth member 6 is pushed, is provided with a concave portion 2b1. A width of the concave portion 2b1 is the same size of a width of the outer teeth member 4. The outer peripheral surface 6d of the inner teeth member 6 is pushed to corners 2b2 and 2b3 of the concave portion 2b1. Thereby, a part of an outer peripheral side of the inner teeth member 6 locating nearby the first outer teeth member 4 is supported by the corners 2b2 and 2b3 at two points. A part of the inner peripheral side that is the opposite side of the part of the outer peripheral side is supported by a pair of protruding portions 2g at two points through the first outer teeth member 4 and the switching member 3. Accordingly, the backlash of the inner teeth member 6 with respect to the inner teeth member 6 is prevented.

In the lock state shown in FIG. 2, space 14 is formed between the second outer teeth member 5 and the inner teeth member 6. The space 14 is shorter than heights of the outer teeth 5a and the inner teeth 6c. Thus, the space 14 enables the outer teeth 5a and the inner teeth 6c to mesh each other, and forms clearance between them. On the other hand, in the lock state, clearance is not formed between the first outer teeth member 4 and the inner teeth member 6.

The first embodiment is comprised as described above. The connecting apparatus 1 includes the backlash preventing mechanism 13 for preventing the backlash of the inner teeth member 6 with respect to the guide member 2 by a switching member 3 pushing the inner teeth member 6 to the rotation support portion 2b of the guide member 2 through the first outer teeth member 4 in the lock state. In the lock state, the space 14 is formed between the outer teeth 5a of the second outer teeth member 5 and inner teeth 6c of the inner teeth member 6, and the space 14 enables them not only to mesh each other but to form the clearance between them in a radial direction as well.

Therefore, the inner teeth member 6 is pushed to the guide member 2 through the first outer teeth member 4 in the lock state. Thus, the backlash of the inner teeth member 6 with respect to the guide member 2 is prevented. On the other hand, the space 14 is formed and the clearance is formed between the second outer teeth member 5 and the inner teeth member 6 in the radial direction. Thus, the inner teeth member 6 is securely pushed to the guide member 2 because the second outer teeth member 5 does not interrupt. In addition, the second outer teeth member 5 restricts a relative rotation with respect to the inner teeth member 6 because the second outer teeth member 5 meshes with the inner teeth member 6 in the lock state.

As shown in FIG. 2, the rotation support portion 2b of the guide member 2 is provided with the concave portion 2b1. The inner teeth member 6 is pushed to two corners 2b2 and 2b3 of the concave portion 2b1. Accordingly, the inner teeth member 6 is securely supported at the two points with respect to the guide member 2 in the lock state. As a result, the backlash of the inner teeth member 6 is securely prevented.

As shown in FIG. 2, the backlash preventing mechanism 13 includes the protruding portion 2g. The protruding portion 2g is provided with the inclined surface 2g1. Accordingly, the switching member 3 gradually moves to the first outer teeth member 4. Thereby, the first outer teeth member 4 may securely push the inner teeth member 6 to the guide member 2 regardless of a variety margin of error thereof.

As shown in FIG. 2, the guide member 2 is provided with two support surfaces 2f1. Thus, the backlashes of the first outer teeth member 4, the switching member 3 and the guide member 2 with respect to the inner teeth member 6, may be supported at four points. Accordingly, the effect of preventing the backlash improves.

Second Embodiment

A second embodiment will be explained in accordance with FIG. 5. The second embodiment is different from the above embodiment in that the second embodiment includes a switching member (rotational cam) 23 and outer teeth members 24 to 26 shown in FIG. 5 in place of the switching member 3 and the outer teeth members 4 and 5 shown in FIG. 2, etc. As described below, the second embodiment will be explained mainly about the different points.

Figure 5:
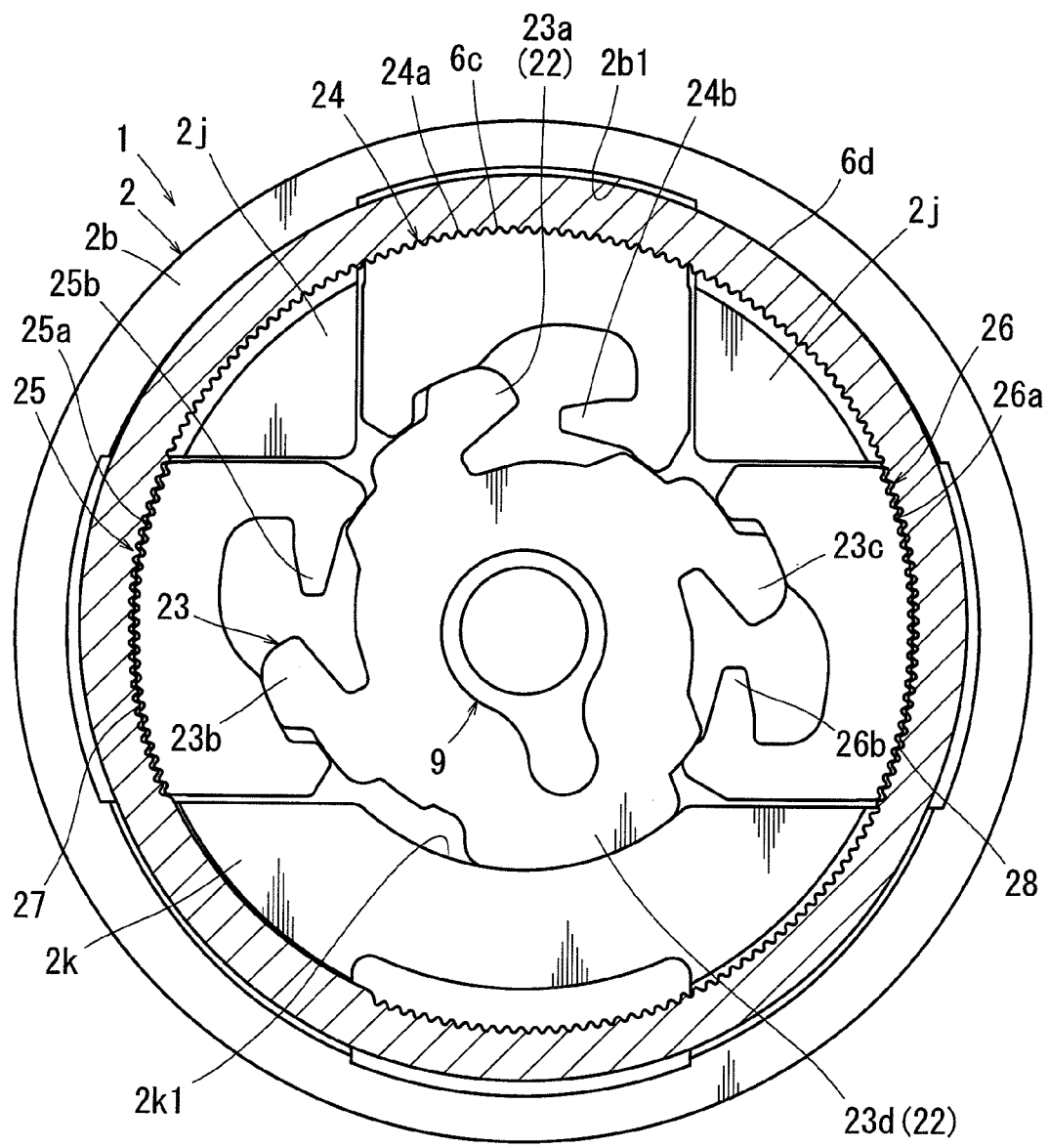
FIG. 5 is a front sectional view of a connecting apparatus of a second embodiment, equivalent to FIG. 2.
Figure 6:
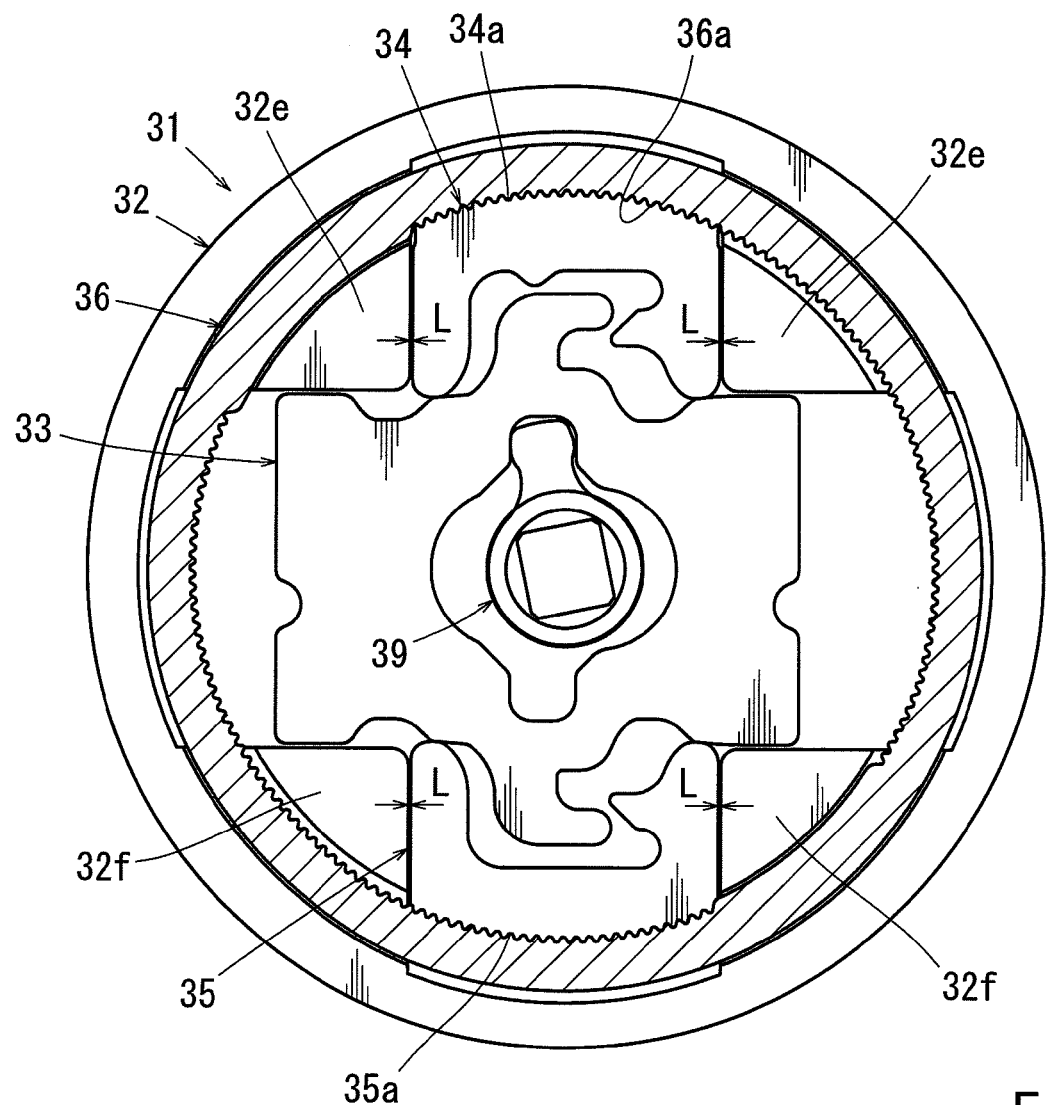
FIG. 6 is a front sectional view of a conventional connecting apparatus, equivalent to FIG. 2.

As shown in FIG. 5, the switching member 23 is mounted at a center of the guide member 2 rotatably about an axis of the center. The operating member 9 is fit in the center of the switching member 23. The operating member 9 is biased in a counter clockwise direction that is a lock direction by the coil spring 8 shown in FIG. 1, and biases the switching member 23 in a lock direction. The operating member 9 is rotated by an operating lever (not shown) in a clockwise direction that is an unlock direction. Thereby, the operating member 9 rotates the switching member 23 in an unlock direction.

As shown in FIG. 5, an outer peripheral portion of the switching member 23 is provided with claws 23a to 23c. The claws 23a to 23c pushes the outer teeth members 24 to 26 in an outer radial direction when the switching member 23 rotates in the lock direction. Thereby, the outer teeth members 24 to 26 mesh with the inner teeth member 6, and the connecting apparatus 1 is made in a lock state. The claws 23a to 23c push hook portions 24b to 26b formed with the outer teeth members 24 to 26 in an inner radial direction when the switching member 23 is rotated in the unlock direction. Thereby, the meshing of the outer teeth members 24 to 26 with the inner teeth member 6 is released, and the connecting apparatus 1 is made in the unlock state.

The guide member 2 includes three guide portions 2j and 2k shown in FIG. 5 in place of the four guide portions 2e and 2f shown in FIG. 2. The first outer teeth member 24 is set movably in a radial direction between the pair of the guide portions 2j. The second outer teeth members 25 and 26 are set movably in a direction substantially perpendicular to the movement direction of the outer teeth member 24 between the pair of the guide portions 2k and 2j. As shown in FIG. 5, the outer teeth members 24 to 26 include outer teeth 24a to 26a on an outer peripheral surface thereof. The outer teeth 24a to 26a mesh the inner teeth 6c of the inner teeth member 6 in the lock state.

As shown in FIG. 5, the guide portion 2k of the guide member 2 is provided with a support surface 2k1. In the lock state, the support surface 2k1 supports the switching member 23 for the first outer teeth member 24 not to move in a direction in that the first outer teeth member 24 moves apart from the inner teeth member 6.

As shown in FIG. 5, a backlash preventing mechanism 22 is provided between the switching member 23 and the guide member 2. The backlash preventing mechanism 22 includes a claw 23a and a protruding portion 23d formed with the switching member 23. The protruding portion 23d contacts with an inner peripheral surface 2k1 of the guide portion 2k when the switching member is rotated to the lock position (position of a counter clockwise direction of FIG. 5). The claw 23a pushes the inner teeth member 6 to the rotation support portion 2b through the first outer teeth member 24 when the switching member 23 is moved to the lock position.

Therefore, the inner teeth member 6 in the lock state includes a part of the outer peripheral surface, locating nearby the first outer teeth member 4 and being pushed to the rotation support portion 2b, and a part of the inner peripheral surface, locating at the opposite side of the part of the outer peripheral surface and being supported at the guide portion 2k of the guide member 2 through the first teeth member 24 and the switching member 3. As a result, the backlash of the inner teeth member 6 with respect to the guide member 2 is restricted.

In the lock state shown in FIG. 5, spaces 27 and 28 are formed between the second outer teeth members 25 and 26 and the inner teeth member 6. The spaces 27 and 28 are shorter than teeth heights of outer teeth 25a and 26a and the inner teeth 6c. The spaces 27 and 28 enable the outer teeth 25a and 26a and the inner teeth 6c to mesh with each other, and have enough size to form clearances between the outer teeth 25a and 26a and the inner teeth 6c.

The second embodiment is comprised as described above. The switching member 23 is rotatably supported by the guide member 2, and moves the outer teeth members 24 to 26 in radial directions when the switching member 23 is rotated. Further, the second embodiment includes one first outer teeth member 24 and two second outer teeth members 25 and 26. Thus, there are three outer teeth members 24 to 26, and two of them are the second outer teeth members 25 and 26. Thereby, deterioration of lock strength may be restricted comparing with a configuration including only one second outer teeth member.

The present invention should not be limited to the first and second embodiments, but may be configured as embodiments as described below.

(1) For example, the connectors of the first and second embodiments are used as a reclining apparatus for a vehicle seat. However, the connectors may be used as other connectors for rotatably concentrically connecting two members, and the other connectors may switch between an unlock state in which the two members may rotate and a lock state in which the two members may not rotate. Meanwhile "concentrically" includes not only a case in which rotational axes of the two members are completely the same position but also a case in which the axes are substantially the same position.

(2) The backlash preventing mechanism 13 of the first embodiment includes the protruding portions 2g formed on the guide member 2, and the protruding portions 2g move the switching member 3 to the first outer teeth member 4. However, it may be configured having a protruding portion or the like protruding from the switching member to the guide member. And the protruding or the like moves the switching member to the first outer teeth member.

(3) The backlash preventing mechanism 22 of the second embodiment includes the claw 23a and the protruding portion 23d. And the backlash preventing mechanism 22 moves the first outer teeth member 24 in the outer radial direction a longer distance than distances of the second outer teeth members 25 and 26. However, it may be configured having a protruding portion or the like provided between a first outer teeth member and a switching member for moving the first outer teeth member a longer distance than a distance of a second outer teeth member. And the protruding portion or the like moves the inner teeth member to a guide member through the first outer teeth member.

(4) The connector 1 described in the second embodiment includes two second outer teeth members 25 and 26. However, it may include one second outer teeth member, or three or more second outer teeth members.

The invention claimed is:

1. A connecting apparatus, for rotatably and concentrically connecting two members, and for switching between an unlock state in which the two members are configured to rotate and a lock state in which the two members are not configured to rotate, the connecting apparatus comprising:
an inner teeth member, attached to one of the two members, and including inner teeth on an inner peripheral surface;
a guide member, attached to the other of the two members, and including a rotation support portion rotatably supporting an outer peripheral surface of the inner teeth member;
a first outer teeth member and a second outer teeth member, the outer teeth members movably attached on the guide member and including outer teeth configured to mesh with the inner teeth; and
a switching member movably supported by the guide member, the switching member configured to switch to the lock state in which the outer teeth mesh with the inner teeth and the unlock state in which the outer teeth do not mesh with the inner teeth when the switching member moves the first and second outer teeth members, wherein:
the guide member is formed with a support surface supporting the switching member in the lock state for preventing the first outer teeth member from moving in a direction in which the first outer teeth member disengages from the inner teeth member,
the connecting apparatus further comprises a backlash preventing mechanism configured to prevent a backlash of the inner teeth member with respect to the guide member by the switching member pushing the inner teeth member to the rotation support portion of the guide member via the first outer teeth member in the lock state, and
a space is formed between the outer teeth of the second outer teeth member and the inner teeth of the inner teeth member in the lock state, the space extends along an outer length of the second outer teeth member and permits the outer teeth of the second outer teeth member and the inner teeth of the inner teeth member to mesh with each other, and forms clearance there-between in an outermost radial direction, wherein the backlash preventing mechanism includes a protruding portion protruding from the support surface of the guide member, and the protruding portion is formed with an inclined surface that causes the switching member to gradually move toward the first outer teeth member in a radial direction with respect to the guide member when the switching member moves from the unlock state to the lock state.

2. A connecting apparatus as in claim 1, wherein:
the rotation support portion of the guide member is formed with a concave portion at a part of an inner peripheral portion pushed by the inner teeth member, and
the inner teeth member is pushed to two corners of the concave portion.

* * * * *